(12) United States Patent
Kushida (10) Patent No.: US 7,715,097 B2
(45) Date of Patent: May 11, 2010

(54) SCREEN (75) Inventor: Takashi Kushida, Tokyo (JP)

(73) Assignee: Teijin Limited, Osaka (JP)

( * ) Notice: Subject to any disclaimer, the term of this patent is extended or adjusted under 35 U.S.C. 154(b) by 446 days.

(21) Appl. No.: 11/632,947

(22) PCT Filed: Jul. 20, 2005

(86) PCT No.: PCT/JP2005/013681

§ 371 (c)(1),
(2), (4) Date: Jan. 19, 2007

(87) PCT Pub. No.: WO2006/009293

PCT Pub. Date: Jan. 26, 2006

(65) Prior Publication Data

US 2008/0088961 A1 Apr. 17, 2008

(30) Foreign Application Priority Data

| Jul. 22, 2004 | (JP) | ............................. 2004-214195 |
| Jul. 22, 2004 | (JP) | ............................. 2004-214196 |
| Sep. 9, 2004 | (JP) | ............................. 2004-262184 |
| Oct. 28, 2004 | (JP) | ............................. 2004-314079 |
| Nov. 26, 2004 | (JP) | ............................. 2004-342415 |

(51) Int. Cl.
*G03B 21/60* (2006.01)

(52) U.S. Cl. ...................................................... 359/453

(58) Field of Classification Search ......... 359/452–453, 359/460
See application file for complete search history.

(56) References Cited

U.S. PATENT DOCUMENTS

| 4,983,016 | A | * | 1/1991 | Yamamoto | ................... 359/452 |
| 6,346,311 | B1 | * | 2/2002 | Yeo et al. | ..................... 428/143 |
| 6,590,705 | B1 | * | 7/2003 | Allen et al. | ................. 359/490 |
| 7,408,707 | B2 | * | 8/2008 | Yeo et al. | ..................... 359/452 |
| 2003/0002153 | A1 | * | 1/2003 | Hiraishi et al. | .............. 359/452 |
| 2003/0174396 | A1 | * | 9/2003 | Murayama et al. | .......... 359/453 |

FOREIGN PATENT DOCUMENTS

| CN | 1105922 C | 4/2003 |
| JP | 02-077736 A | 3/1990 |
| JP | 5-113606 A | 5/1993 |
| JP | 5-289174 A | 11/1993 |
| JP | 9-274108 A | 10/1997 |
| JP | 9-297204 A | 11/1997 |
| JP | 11-202417 A | 7/1999 |
| JP | 2000-280267 A | 10/2000 |
| JP | 2001-049008 A | 2/2001 |
| JP | 2001-49008 A | 2/2001 |

(Continued)

*Primary Examiner*—Christopher E Mahoney
*Assistant Examiner*—Leon W. Rhodes
(74) *Attorney, Agent, or Firm*—Sughrue Mion, PLLC (57) ABSTRACT

The screen of the invention comprises an oriented film having a direction of maximum scattering (scattering axis) and a direction of minimum scattering (transmitting axis) for linear polarized light, and containing macromolecular fine particles in a macromolecular matrix, wherein the refractive index of the macromolecular fine particles is within a specified range and the matrix and macromolecular fine particles satisfy a specified relationship. The screen reproduces bright and high-quality projected images with virtually no moire effect or glare, and is therefore highly useful as a transmissive or reflective projector screen.

14 Claims, 4 Drawing Sheets

FOREIGN PATENT DOCUMENTS

| | | |
|---|---|---|
| JP | 2001-66701 A | 3/2001 |
| JP | 2001-066701 A | 3/2001 |
| JP | 2001-242546 A | 9/2001 |
| JP | 2001-311806 A | 11/2001 |
| JP | 2001-311807 A | 11/2001 |
| JP | 2002-022966 A | 1/2002 |
| JP | 2002-22966 A | 1/2002 |
| JP | 2002-328225 A | 11/2002 |
| JP | 2002-540445 A | 11/2002 |
| JP | 2003-043258 A | 2/2003 |
| JP | 2003-43258 A | 2/2003 |
| JP | 2003-107217 A | 4/2003 |
| JP | 2003-248272 A | 9/2003 |
| JP | 2004-029272 A | 1/2004 |
| JP | 2004-29272 A | 1/2004 |
| JP | 2004-054132 A | 2/2004 |
| JP | 2004-54132 A | 2/2004 |
| JP | 2005-017751 A | 1/2005 |
| JP | 2005-107660 A | 4/2005 |
| WO | 97/32223 A1 | 9/1997 |
| WO | 03-098346 A1 | 11/2003 |

* cited by examiner

SCREEN

TECHNICAL FIELD

The present invention relates to a screen. In particular, it relates to a screen with excellent display quality achieved by the use of an oriented film having a different scattering property depending on the direction of polarization, that is useful as a screen for a projector (projector screen).

BACKGROUND ART

Projection display devices are in increasing demand because they allow large-screen display to be realized relatively easily, with minimal device size and at low cost compared to direct-view display devices. Projection display devices having projectors that employ liquid crystal display elements as two-dimensional optical switch elements differ from projection display devices employing CRT projection tubes, in that they use a dot matrix display allowing reproduction of images displayed to high precision without blurring up to the peripheral sections of the screen. This technology therefore offers the most potential for high-definition digital televisions.

Their images are projected onto a screen. The screens are largely of two types, namely reflective screens that are observed from the projector side and transmissive screens that are observed from the side opposite the projector with the screen in the middle.

Transmissive screens are normally composed of a fresnel lens sheet and a lenticular lens sheet. A lenticular lens has rectilinearly shaped lenses situated in a regular pattern, and therefore images are prone to the moire effect.

Japanese Unexamined Patent Publication HEI No. 2-77736 discloses a transmissive screen have a construction wherein spherical lenses are spread over a transparent base and the lenses are fixed with a transparent resin. A screen having this construction does not require a die for manufacture and hence no limits are placed on its size during manufacture. Consequently, it is possible to realize a large-picture transmissive screen without seams. In addition, incident light from the spherical lens side is condensed by the lens effect and isotropically scattered, thereby producing a wide-angle display both horizontally and vertically. However, glare often occurs depending on the angle, and may reduce the display quality.

Transparent screens that are attached to show windows and produce images of moving or still advertisements are also known. Such transparent screens ordinarily employ hologram elements, whereby projected light from a projector provided on the opposite side of the viewer from the hologram element is projected onto the hologram element to form an image, and the hologram element diffracts and scatters the projected light forward allowing the viewer to recognize an image. (Japanese Unexamined Patent Publication HEI No. 11-202417)

However, hologram elements are extremely expensive, while they are limited in their diffraction and scattering angles and thus have restricted viewing angles. Furthermore, because hologram elements require strict placing of the projector, screen and viewer, they offer very little freedom of installation.

On the other hand, it has been attempted to provide reflective screens with improved contrast by selective reflection of only certain specific polarized light.

For example, Japanese Unexamined Patent Publication HEI No. 5-107660 and Japanese Unexamined Patent Publication No. 2005-17751 disclose circular polarized reflective screens employing cholesteric liquid crystals. These exhibit enhanced contrast by reflecting specific circular polarized light and absorbing the opposite circular polarized light. The invention described in Japanese Unexamined Patent Publication No. 2005-17751 controls the reflective properties to reduce glare caused by mirror reflection.

Japanese Patent Public Inspection No. 2002-540445 discloses a reflective screen of a type which reflects specific linear polarized light by a multilayer structure. This screen has a mirror surface that causes glare, and therefore it has not been developed. Also, International Patent Publication No. WO03/098346 describes an invention whereby the aforementioned reflecting polarizing plate and scattering polarizing plate are combined to reduce glare.

DISCLOSURE OF THE INVENTION

It is the principal object of the invention to provide a novel screen.

It is another object of the invention to provide a screen with high display quality.

It is yet another object of the invention to inexpensively provide a wide-angle projector screen with low moire and glare effects.

Other objects and advantages of the invention will become apparent from the detailed description below.

According to the invention, the objects and advantages of the invention are achieved by a screen that comprises an oriented film having a direction of maximum scattering (scattering axis) and a direction of minimum scattering (transmitting axis) for linear polarized light, and containing macromolecular fine particles in a polymer matrix, wherein the refractive index of the macromolecular fine particles is within a specified range and the matrix and macromolecular fine particles satisfy a specified relationship.

The present inventors focused on a selective scattering property for polarized light. Specifically, it was found that when a highly transparent macromolecular film is used as the material for the screen and the macromolecular film is irradiated with linear polarized light, it is important that the scattering property differ depending on the polarization axis direction of the linear polarized light. In particular, it was found that since the scattering is forward scattering, as the scattering property, and the diffuse transmittance of scattered light in the scattering axis direction is high, this type of screen is especially useful as a rear-projection type transparent screen. As a result of further examination, the present inventors surprisingly discovered that a film having such a scattering property can be obtained by dispersing macromolecular fine particles having a specified refractive index in a matrix, where the macromolecular fine particles satisfy the refractive index in a specified relationship with the matrix, whereupon the present invention was accomplished.

EXPLANATION OF SYMBOLS

1: Oriented film
2: Polarizing plate
3: Liquid crystal projector
4: Adhesive
5: Glass
6: Viewer
7: Polymer matrix
8: Macromolecular fine particles
9: Oriented film Preferred Embodiments of the Invention The screen of the invention is characterized by having a selective scattering property for polarized light, wherein the scattering property changes substantially depending on the direction of vibration of the linear polarized light. More specifically, the screen of the invention has, in the plane of the screen, a direction of maximum scattering (scattering axis) and a direction of minimum scattering (transmitting axis) upon incidence of linear polarized light. When polarized light is matched on the scattering axis, the line of sight is poor on the opposite side (the other side of the screen), while if it is matched on the transmitting axis, viewing is possible on the opposite site.

A reflective screen is a type of screen wherein an image is viewed from the same side from which the projector projects the image. A rear-projection screen is a type of screen wherein an image is viewed from the opposite side from which the projector projects the image, with the screen in the middle.

The screen of the invention is basically transparent. Here, "transparent" means at least 50% transmittance for ordinary non-polarized light.

One of the constituent elements of the screen of the invention is an oriented film containing macromolecular fine particles in a polymer matrix. The macromolecular fine particles have a refractive index (n) satisfying the relationship represented by the following inequality (1).

$$1.51 \leq n \leq 1.58 \tag{1}$$

The macromolecular fine particles also have a refractive index in a relationship with the polymer composing the matrix of the oriented film that satisfies the following inequalities (2) and (3).

$$0 \leq |N\text{trans}-n\text{trans}| \leq 0.03 \tag{2}$$

$$0.03 \leq |N\text{scat}-n\text{scat}| \leq 0.2 \tag{3}$$

Here, Ntrans and Nscat represent the refractive indices of the matrix in the transmitting axis direction and scattering axis direction, respectively, while ntrans and nscat represent the refractive indices of the macromolecular fine particles in the transmitting axis direction and scattering axis direction, respectively.

The refractive index referred to here is the mean refractive index, and when the macromolecular fine particles have a multilayer structure with two or more layers (for example, a core-shell type), it is the mean refractive index of the entire structure. If the refractive index is smaller than 1.51 or larger than 1.58, matching of the refractive index in the transmitting axis direction with the matrix will be insufficient, thus lowering the anisotropy of scattering for polarized light. The relationship is preferably $1.53 \leq n \leq 1.58$.

When $|N\text{trans}-n\text{trans}|>0.03$ in inequality (2) above, the difference in the transmitting axis refractive indices between the matrix and macromolecular fine particles will be increased. Scattering will therefore be increased in the transmitting axis direction, resulting in reduced light transmission and a darker image.

When $0.03 \geq |N\text{scat}-n\text{scat}|$ in inequality (3) above, the difference in the refractive indices of the matrix and macromolecular fine particles in the scattering axis direction will be reduced, resulting in lower scattering. On the other hand, if $|N\text{scat}-n\text{scat}|>0.2$, the difference in refractive indices will be too large, making back scattering dominant and lowering the transmittance.

The oriented film preferably satisfies the following inequality (4):

$$H\text{scat}/H\text{trans} \geq 2 \tag{4}$$

Here, Hscat represents the haze value in the scattering axis direction, and Htrans represents the haze value in the transmitting axis direction.

In inequality (4), the value of Hscat/Htrans represents the anisotropy of haze with respect to the direction of vibration of polarized light in the oriented film. If this value is less than 2, the anisotropy of haze with respect to the direction of vibration of polarized light will be insufficient, such that an adequate selective scattering property for polarized light may not be achieved. The value of Hscat/Htrans is more preferably 5 or greater, even more preferably 8 or greater, and yet more preferably 10 or greater. The oriented film also preferably satisfies the following inequality (5):

$$1 \leq TT\text{trans}/TT\text{scat} \leq 2 \tag{5}$$

Here, TTtrans represents the total light transmittance in the transmitting axis direction, and TTscat represents the total light transmittance in the scattering axis direction.

When TTtrans/TTscat>2 in inequality (5) above, usually the light transmittance in the scattering axis direction (TTscat) is extremely small, such that back scattering becomes dominant instead of forward scattering. Thus, light transmittance in the scattering axis direction is reduced, which is undesirable because the light utilization efficiency is significantly impaired for applications that employ light in the scattering axis direction. Preferably, the relationship is $1 \leq TT\text{trans}/TT\text{scat} \leq 1.5$ and more preferably $1 \leq TT\text{trans}/TT\text{scat} \leq 1.25$, and ideally $1=TT\text{trans}/TT\text{scat}$.

If the oriented film satisfies the following inequality (6):

$$TT \geq 60\% \tag{6},$$

it will have high transparency and will be particularly suitable as a rear-projection screen. Here, "TT" represents the total light transmittance.

If the value of TTscat in inequality (6) above is less than 60%, for example when the screen is used as a rear-projection projector screen or the like, the amount of light from the projector passing through the screen will be reduced, resulting in a darker image. The value of TTscat is more preferably 70% or greater, even more preferably 75% or greater and yet more preferably 80% or greater.

The oriented film preferably satisfies the following inequality (7):

$$PT\text{trans}=TT\text{trans}-DF\text{trans} \geq 50\% \tag{7}$$

Here, PTtrans represents the parallel light transmittance in the transmitting axis direction, TTtans represents the total light transmittance in the transmitting axis direction, and DFtrans represents the diffused light transmittance in the transmitting axis direction.

If the value of PTtrans in inequality (7) above is less than 50%, the haze value in the transmitting axis direction will be increased, making it difficult for the condition of the opposite side to be confirmed through the film. The value of PTtrans is more preferably 60% or greater, and even more preferably 70% or greater.

The oriented film preferably also satisfies the following inequality (8):

$$PTscat=TTscat-DFscat \leq 40\% \quad (8).$$

Here, PTscat represents the parallel light transmittance in the scattering axis direction, TTscat represents the total light transmittance in the scattering axis direction, and DFscat represents the diffused light transmittance in the scattering axis direction.

If the value of PTscat in inequality (8) above exceeds 40%, scattering in the scattering axis direction will be insufficient, and the light source will tend to directly strike the eyes with greater probability. This will therefore result in glare, which may constitute a notable problem especially in the case of a projected image. The value of PTscat is more preferably no greater than 30% and even more preferably no greater than 20%, although ideally PTscat=0%.

The oriented film preferably satisfies at least two, more preferably satisfies at least three, and most preferably simultaneously satisfies all four of the inequalities (5) to (8) above. For example, inequality (8) can be satisfied by increasing the back scattering property and reducing TTscat, but it is difficult to simultaneously satisfy inequality (6) Thus, the conditions for simultaneously satisfying inequalities (5) to (8) above are specific, and this is a very distinctive feature of the oriented film of the invention. By simultaneously satisfying inequalities (5) to (8), it is possible to create a feature whereby, despite a large difference in the scattering property depending on the direction of polarization, the transmittance is kept at high transmittance while polarization dependency is low.

The oriented film of the invention is a highly transparent film having a polymer as the matrix, with macromolecular fine particles dispersed in the matrix. The polymer is suitably an optically transparent macromolecule. As examples, there may be mentioned crystalline aromatic polyesters such as polyethylene terephthalate and polyethylene naphthalate. A crystalline macromolecule is preferred for use because it will tend to exhibit a difference in refractive index for the transmitting axis and scattering axis. Polyethylene terephthalate is particularly preferred.

As macromolecular fine particles there may be selected any that are essentially incompatible with the aforementioned polymer. For example, there may be mentioned thermoplastic polymers including acrylic resins such as polymethyl methacrylate resin, MS resin and AS resin, polystyrenes such as syndiotactic styrene resin, and polybutadienes. There may also be mentioned fine particles formed of crosslinked acryl resins, crosslinked polystyrene resins and the like.

The shapes of the macromolecular fine particles may be spherical, fusiform (rugby ball-shaped), round, ellipsoid, rectangular or the like.

Macromolecular fine particles with a core-shell type structure are also suitable. Here, a core-shell structure is a bilayer structure wherein the fine particles have a center layer (core) and a surface layer (shell), but the boundary between the core and shell does not necessarily need to be distinct. For example, it includes a structure comprising at least two different macromolecules, a macromolecular component forming the center portion as the core and a macromolecular component forming the surface layer as the shell. For example, there may be mentioned a structure wherein the core is formed of a homopolymer composed of monomer A and the portion from the outermost section of the core to the outermost section of the shell is made of a copolymer of monomer A and monomer B, in a copolymerization ratio such that the proportion of monomer A decreases away from the center of the core. Alternatively, the core and shell portions are composed of polymers with completely different fundamental skeletons.

The particle size of the macromolecular fine particles is preferably in the range of 0.01-10 µm and more preferably in the range of 0.05-1 µm. The particle size referred to here is the mean particle size. If the particle size of the fine particles is less than 0.01 µm, the scattering efficiency may be inadequate. If it is larger than 10 µm, on the other hand, voids may be formed around the fine particles due to the stress of stretching and other steps during manufacture of the film, possibly resulting in notably impaired optical characteristics. The content of the macromolecular fine particles is preferably 0.01-40 parts by weight to 100 parts by weight of the polymer. At less than 0.01 parts by weight, the parallel light transmittance (PTscat) on the scattering axis will tend to be increased. If it exceeds 40 parts by weight, the total light transmittance (TTtrans) on the transmitting axis will be smaller, possibly resulting in reduced light transmittance of the oriented film. The content of the macromolecular fine particles is more preferably 0.1-20 parts by weight and even more preferably 0.2-15 parts by weight with respect to 100 parts by weight of the polymer.

This type of oriented film is a film having the macromolecular fine particles dispersed in the polymer matrix. The mode of dispersion is preferably one wherein the macromolecular fine particles are essentially aligned in the direction of orientation of the polymer molecular chains. Ordinary macromolecular fine particles prior to alignment are dispersed in the polymer matrix as secondary aggregation, due to the effect of their surface energy. If stretching is carried out, for example, in a uniaxial direction, the macromolecular fine particles adopt an alignment in the direction of stretching. This results in formation of long, thin light-scattering elements with the macromolecular fine particles lying in rows, so that shape anisotropy is added to the refractive index anisotropy, thereby amplifying the polarization selectivity of the optical characteristics.

The thickness of the oriented film of the invention is appropriately selected within the range of 0.1-500 µm and preferably 5-100 µm.

The manufacturing process for the oriented film may involve preparing prescribed amounts of the polymer and macromolecular fine particles and blending them by melt kneading, and forming the obtained blend into a film by a conventional method such as melt extrusion. There may also be mentioned methods of uniaxial stretching in one direction, such as in the MD or TD direction. Here, MD represents machine direction and TD represents transverse direction.

From the viewpoint of productivity, the stretching method is preferably continuous longitudinal uniaxial stretching or continuous transverse uniaxial stretching. The stretching conditions may be appropriately selected depending on the polymer used. For example, when polyethylene terephthalate (PET) is used as the matrix polymer, the PET may be melt kneaded with the macromolecular fine particles, and then melt extruded to obtain a film, and further stretched at a temperature of usually 80-110° C. The stretch ratio may be selected within a range of, for example, usually a factor of 3-5. After stretching, the film may be subjected to heat set treatment at 120-180° C. The film of the invention is preferably strongly oriented along one axis. In most cases it can be a uniaxially stretched film or width-anchored uniaxially stretched film, or even in the case of a biaxially stretched film, it may be strongly oriented in either one of the directions.

Thus, since the oriented film can be produced by blending together the polymer and macromolecular fine particles by a melt kneading method and then forming a film by a melt process, superior productivity is achieved.

Such an oriented film possesses the properties of a transparent screen of the invention, and specifically, it possesses the special property of selectivity for the direction of polarization of linear polarized light. In other words, the film has, in the plane of the film, a polarization direction of maximum scattering (scattering axis) and a direction of minimum scattering (transmitting axis) upon incidence of linear polarized light. When polarized light direction is matched on the scattering axis, the line of sight is poor on the opposite side (the other side of the film), while if it is matched on the transmitting axis, viewing is possible on the opposite site.

Such an oriented film, having a selective scattering property for polarized light and having a scattering property that changes significantly depending on the direction of vibration of linear polarized light, exhibits the unique characteristic of high polarization selectivity for the scattering property, simultaneously with low polarization selectivity for light transmittance. Thus, the oriented film can be used as a special projection screen, such as one wherein the transmitting axis is used for position detection from the back side of the screen.

An oriented film obtained in this manner can be used, for example, in combination with a transparent base, as a transparent screen of the invention. Specifically, the oriented film can be used by attachment to a transparent base using a bonding agent or adhesive. The base may be a glass or acrylic panel with a thickness of 0.5-10 mm.

The transparent screen of the invention can be used as a projector screen, with the aforementioned oriented film laminated with a polarizing element. As an example of a polarizing element there may be mentioned a dichromatic polarizing plate. The dichromatic polarizing plate is preferably laminated so that the transmitting axis of the oriented film and the absorption axis of the dichromatic polarizing plate are aligned.

In this case, it is set so that the scattering axis direction of the oriented film is aligned with the direction of polarization emitted from the liquid crystal projector. This allows linear polarized light contributing to the image to be effectively scattered, in order to obtain a bright display. Moreover, it is possible to minimize scattering in the transmitting axis direction which does not contribute to the image, while the polarized light can be absorbed by the dichromatic polarizing plate. Thus, external light can be effectively absorbed and as a result, the display image contrast is further enhanced.

When the polarization directions of the liquid crystal projector are not aligned for the three colors of RGB, it is necessary to align the directions. As a method of aligning linear polarized light of the projector, there may be employed a "Color select" film by Color Link Japan.

The transparent screen of the invention may also have a scattering layer comprising a transparent filler on the oriented film. The transparent filler may be completely embedded in the scattering layer, or it may be partially exposed from the scattering layer. The scattering layer may be on only one side or on both sides of the oriented film.

As examples of transparent fillers there may be mentioned inorganic fillers such as glass fillers, or polymer fillers such as acrylic fillers.

The particle size of the transparent filler will normally be 1-50 µm.

Examples of methods for forming the scattering layer include a method of using a thermosetting or ultraviolet curing resin as the filler support and coating it onto the film surface, a method of using a transparent filler-containing thermoplastic resin as the film and co-extruding it or forming it onto an oriented film by thermocompression bonding or adhesion onto the oriented film, and a method of forming an adhesive layer containing the transparent filler onto the oriented film for use as both an adhesive layer and a scattering layer.

The thickness of the scattering layer is generally preferred to be 1-20 µm.

The position of the scattering layer may be on one side of the oriented film with the transparent base on the other side, or between the oriented film and the transparent base.

When the screen of the invention is used as a front-reflective projector screen, a reflective layer such as a metal layer may be provided on the rearmost side. For a front-reflective screen, a back scattered picture is viewed from the projector side (rear). However, a portion of the picture image is forward scattered and escapes to the opposite side of the viewer, often reducing the picture brightness. In order to prevent this, a reflective layer made of a metal layer or the like may be provided on the rearmost side from the projector side. The reflective layer causes the forward scattered image to be reflected and returned back, thereby increasing the picture brightness. On the other hand, polarized light not associated with the picture can be absorbed by laminating a dichromatic polarizing plate, to avoid the risk of reduced contrast and glare.

The reflective layer is preferably a metal thin-film, metal foil or metal plate of aluminum, silver or the like.

According to the invention, the use of the oriented film described above is suitable for a rear-projection screen (transmissive screen) or reflective screen.

EXAMPLES

The present invention will now be explained in detail by examples. However, the present invention is in no way limited by the examples.

1. The light transmittance (total light transmittance, scattered light mixture and parallel light transmittance) was measured using a Digital Haze Meter NDH-2000 by Nippon Denshoku Industries Co., Ltd.

2. The refractive index was measured using an ATAGO Abbe Refractometer 2-T by Atago Co., Ltd.

Figure 1:
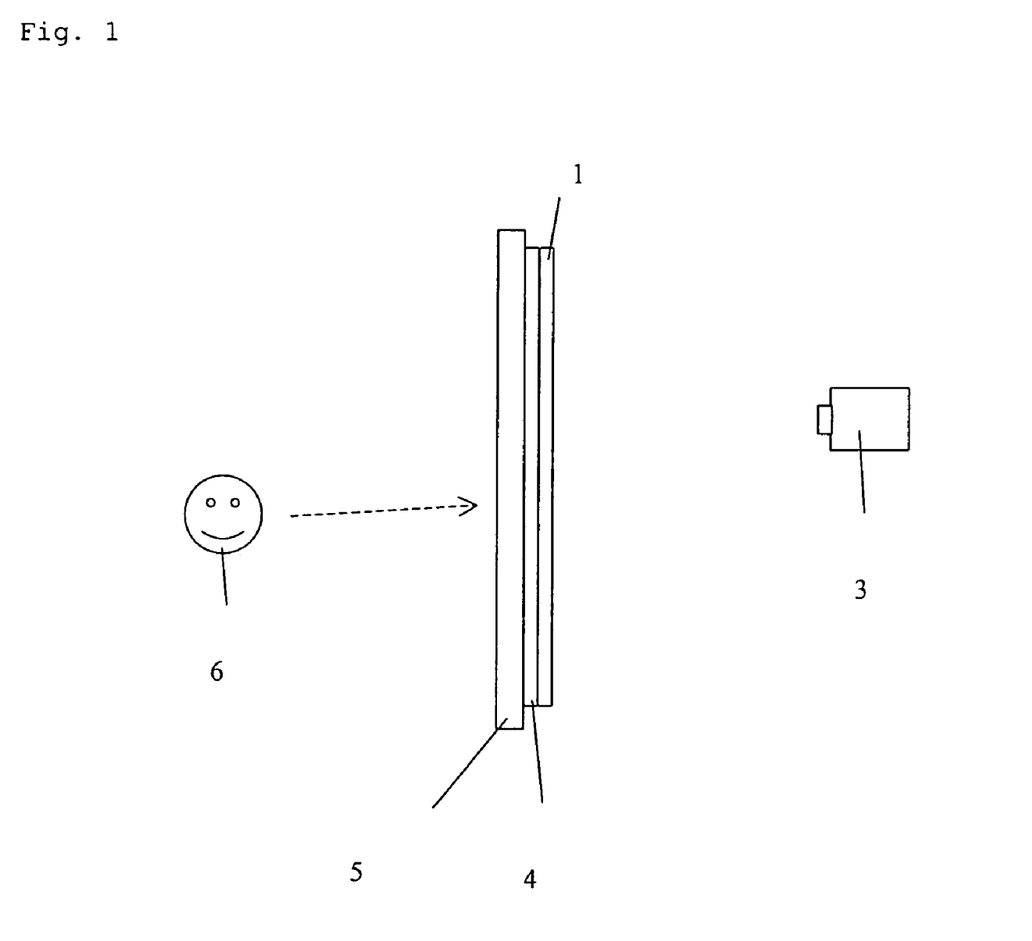
FIG. 1 is schematic diagram showing a method of evaluating image brightness and visibility for the screen fabricated in Example 1.
Figure 2:
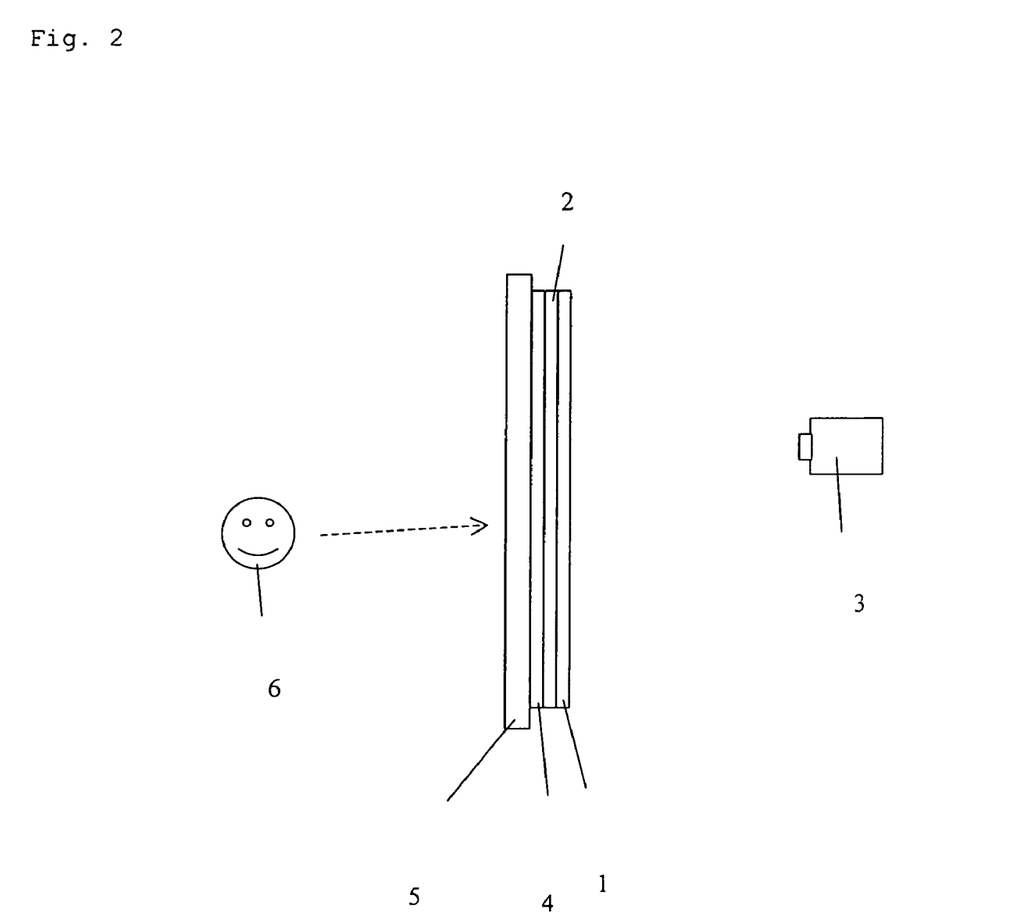
FIG. 2 is schematic diagram showing a method of evaluating image brightness and visibility for the screen fabricated in Example 6.
Figure 3:
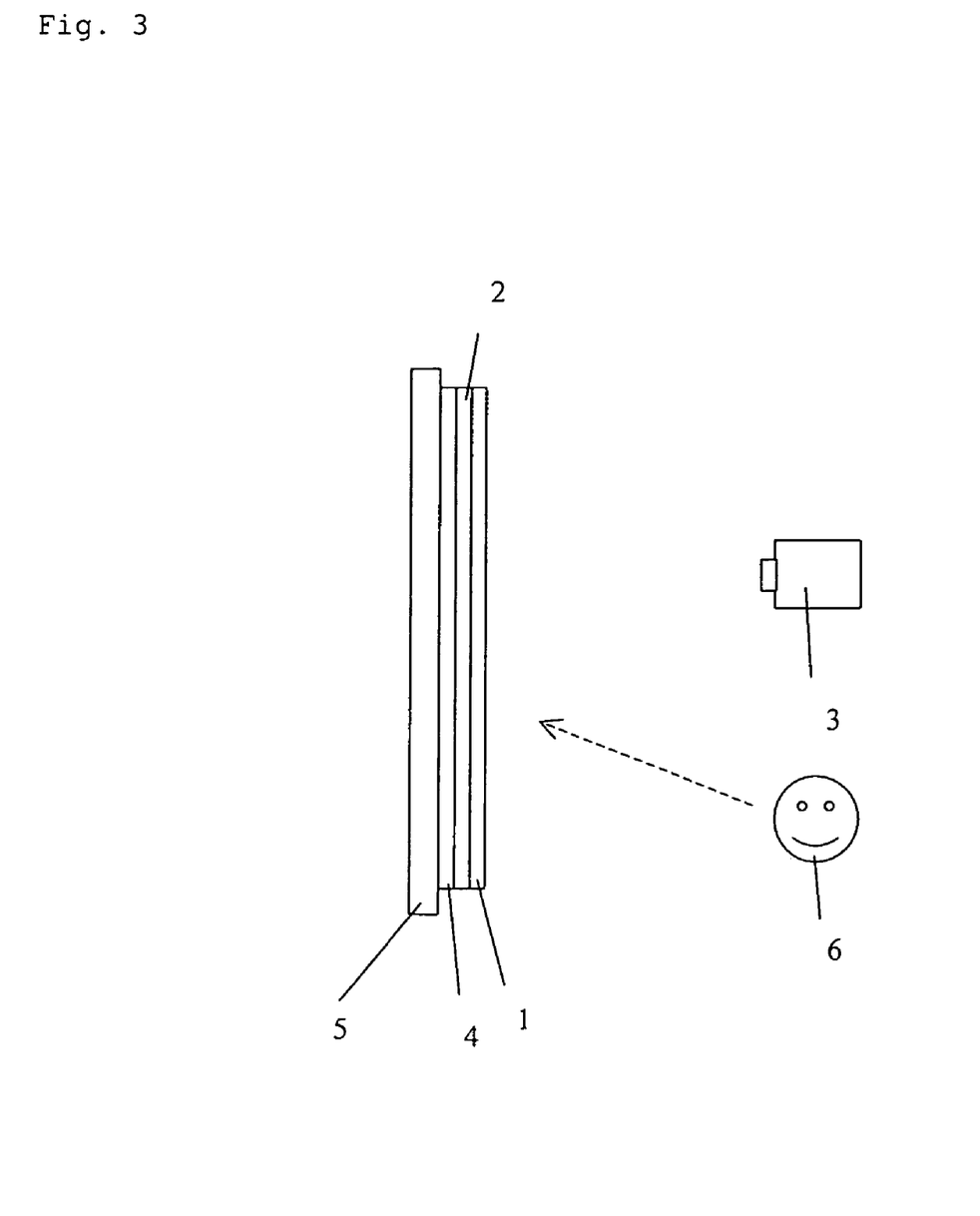
FIG. 3 is schematic diagram showing a method of evaluating image brightness and visibility for the screen fabricated in Example 7.
Figure 4A:
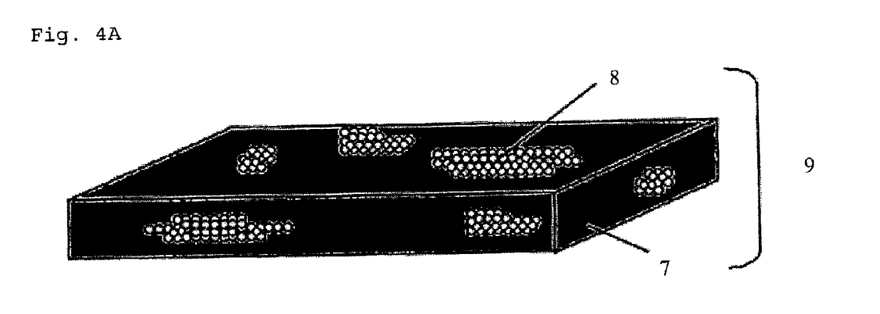
FIGS. 4A and 4B are views of an oriented film showing macromolecular fine particles in a polymer matrix.
Figure 4B:
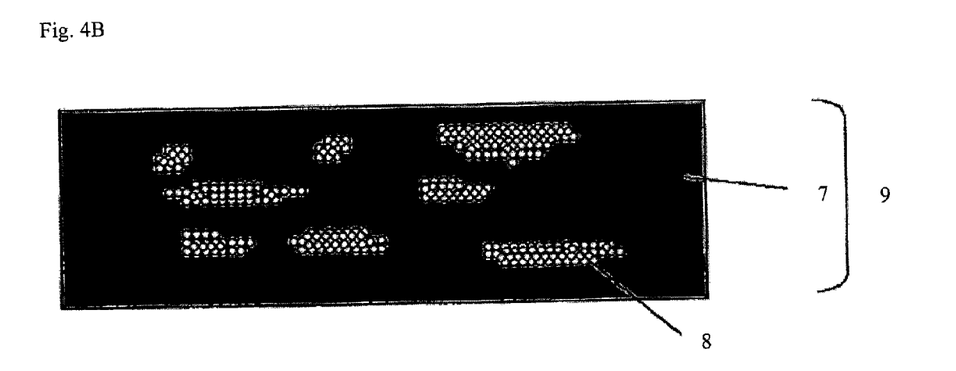

3. The picture brightness was evaluated as illustrated in FIGS. 1 to 3. Specifically, it was measured using an LS-110 luminance meter by Minolta Camera, during projection onto the screen by a projector, and was evaluated relative to Comparative Example 1 as 100.

4. The visibility was evaluated as shown in FIGS. 1 to 3. Specifically, a picture was projected onto the screen by a projector and the degree to which the other side of the screen could be seen was judged. More specifically, the visibility of polarized light hitting the screen in the transmitting axis direction of the screen was visually confirmed. The symbol "o" in the tables stands for distinct visibility of the opposite side of the screen, the symbol "Δ" stands for some visibility, and the symbol "x" stands for poor visibility.

Example 1

A polyethylene terephthalate (PET) resin (product of Teijin Fibers, Ltd.) was used as the polymer for the matrix. To 70 parts by weight of the PET resin there were added 30 parts by weight of macromolecular fine particles (W-300A (mean refractive index=1.5304, mean particle size: 0.15 μm), core-shell fine particles by Mitsubishi Rayon Co., Ltd.), and the mixture was kneaded at 280° C. using a twin-screw kneading extruder to produce a master batch. Next, 10 parts by weight of the master batch and 90 parts by weight of the PET resin were loaded into a single-screw kneading extruder and the mixture was extruder by melt extrusion at 280° C., after which the extruded film was directly subjected to continuous transverse uniaxial stretching at 80° C. in the film width direction (TD direction), to a factor of 4.5. The stretched film was subjected to heat set treatment at 150° C. to obtain an oriented film with a thickness of 100 μm. The light transmittance and refractive index of the oriented film were measured.

The oriented film was attached to a 2 mm-thick glass panel using an ordinary adhesive for optical use, and a rear-projection screen was fabricated as shown in FIG. 1. The picture brightness and visibility from the opposite side of the screen were both highly satisfactory.

Example 2

An oriented film was obtained by the same procedure as Example 1, except that C132 core-shell fine particles by Mitsubishi Rayon Co., Ltd. (mean refractive index: 1.535, mean particle size: 0.095 μm) were used as the macromolecular fine particles, and the final mixing ratio of the PET resin and macromolecular fine particles in the film was 97.2:2.5 (weight ratio).

The oriented film was attached to a 2 mm-thick glass panel using an ordinary pressure-sensitive adhesive for optical use, to fabricate a rear-projection screen. The picture brightness and visibility from the opposite side of the screen were both highly satisfactory.

Example 3

An oriented film was obtained by the same procedure as Example 2, except that PARALOID BTA712 core-shell fine particles by Kureha Corp. (mean refractive index: 1.54, mean particle size: 0.1 μm) were used as the macromolecular fine particles.

The oriented film was attached to a 2 mm-thick glass panel using an ordinary adhesive for optical use, to fabricate a rear-projection screen. The picture brightness and visibility from the opposite side of the screen were both highly satisfactory.

Example 4

An oriented film was obtained by the same procedure as Example 2, except that PARALOID BTA731 core-shell fine particles by Kureha Corp. (mean refractive index: 1.54, mean particle size: 0.19 μm) were used as the macromolecular fine particles.

The oriented film was attached to a 2 mm-thick glass panel using an ordinary adhesive for optical use, to fabricate a rear-projection screen. The picture brightness and visibility from the opposite side of the screen were both highly satisfactory.

Comparative Example 1

After kneading extrusion of 7.5 parts by weight of syndiotactic polystyrene XAREC 141AC by Idemitsu Kosan Co., Ltd.) with 92.5 parts by weight of a polyethylene naphthalate resin (product of Teijin Fibers, Ltd.) at 300° C. to form a film, the film was preheated to 120° C. and tenter stretched to a factor of 4.5 in the TD direction at a stretching temperature of 135° C., and then subjected to heat set treatment at 170° C. to obtain a 70 μm film.

The film was attached to a 2 mm-thick glass panel using an ordinary adhesive for optical use, to fabricate a rear-projection screen. The picture brightness was low, and visibility of the opposite side of the screen was poor.

Comparative Example 2

After kneading extrusion of 10 parts by weight of syndiotactic polystyrene XAREC 141AC by Idemitsu Kosan Co., Ltd.) with 90 parts by weight of a polyethylene naphthalate resin (product of Teijin Fibers, Ltd.) at 300° C. to form a film, the film was preheated to 120° C. and tenter stretched to a factor of 4.5 in the TD direction at a stretching temperature of 135° C., and then subjected to heat fixing treatment at 170° C. to obtain a 100 μm film.

The film was attached to a 2 mm-thick glass panel using an ordinary adhesive for optical use, to fabricate a rear-projection screen. The picture brightness was low, and visibility of the opposite side of the screen was poor.

Comparative Example 3

After kneading extrusion of 15 parts by weight of syndiotactic polystyrene XAREC 81AC by Idemitsu Kosan Co., Ltd.) with 85 parts by weight of a polyethylene naphthalate resin (product of Teijin Fibers, Ltd.) at 300° C. to form a film, the film was preheated to 120° C. and tenter stretched to a factor of 4.5 in the TD direction at a stretching temperature of 135° C., and then subjected to heat fixing treatment at 170° C. to obtain a 100 μm film.

The film was attached to a 2 mm-thick glass panel using an ordinary adhesive for optical use, to fabricate a rear-projection screen. The picture brightness was low, and visibility of the opposite side of the screen was poor.

Comparative Example 4

After dissolving and dispersing 10 parts by weight of a polyvinyl alcohol resin (POVAL 117 by Kuraray Co., Ltd.) and liquid crystals (BL007, by Merck, Ltd.) in 90 parts by weight of water at 80° C., the dispersion was cast onto glass and dried to obtain a liquid crystal dispersed PVA film. The obtained film was uniaxially stretched at room temperature to a factor of 7 to obtain a 70 μm film.

The film was attached to a 2 mm-thick glass panel using an ordinary adhesive for optical use, to fabricate a rear-projection screen. The picture brightness was low, and visibility of the opposite side of the screen was poor.

Comparative Example 5

After kneading 97.5 parts by weight of PET as the matrix polymer and 2.5 parts by weight of PARALOID EXL2311 core-shell fine particles by Kureha Corp. (mean refractive index: 1.47, mean particle size: 0.4 μm) at 280° C. using a single-screw kneading extruder, it was formed into a film by melt extrusion, and the film was directly subjected to continuous uniaxial stretching at 80° C. in the TD direction to a factor of 4.5 and subjected to heat fixing treatment at 115° C. to obtain a 100 μm-thick film.

The film was attached to a 2 mm-thick glass panel using an ordinary adhesive for optical use, to fabricate a rear-projection screen. The picture brightness was low, and visibility of the opposite side of the screen was poor.

TABLE 1

| | Refractive index (n) of macromolecular fine particles | Hscat/ Htrans | TTtrans/ TTscat | TTscat | PT trans | PT scat | \|Ntrans-ntrans\| | \|Nscat-nscat\| | Picture brightness | Visibility |
|---|---|---|---|---|---|---|---|---|---|---|
| Example 1 | 1.5304 | 10.03 | 1.05 | 87% | 84% | 17% | 0.022 | 0.149 | 200 | ○ |
| Example 2 | 1.535 | 11.79 | 1.11 | 82% | 86% | 32% | 0.017 | 0.145 | 142 | ○ |
| Example 3 | 1.54 | 10.11 | 1.12 | 82% | 86% | 31% | 0.012 | 0.140 | 144 | ○ |
| Example 4 | 1.54 | 7.09 | 1.11 | 82% | 83% | 29% | 0.012 | 0.140 | 152 | ○ |
| Comp. Ex. 1 | — | 7.26 | 1.91 | 46% | 78% | 6% | 0.01 | 0.28 | 100 | Δ |
| Comp. Ex. 2 | — | 2.72 | 2.33 | 38% | 58% | 3% | 0.01 | 0.28 | 77 | x |
| Comp. Ex. 3 | — | 1.97 | 2.96 | 29% | 46% | 2% | 0.01 | 0.28 | — | — |
| Comp. Ex. 4 | — | 1.90 | 2.31 | 39% | 49% | 5% | 0.01 | 0.24 | — | — |
| Comp. Ex. 5 | 1.47 | 1.22 | 1.17 | 82% | 26% | 9% | 0.082 | 0.21 | — | — |

Example 5

After dissolving 100 parts by weight of ARONIX M400 by Toagosei Co., Ltd. and 5 parts by weight of IRGACURE 184 by Ciba Specialty Chemicals, Inc. as a photopolymerization initiator in methyl isobutyl ketone, there was added and dispersed therein 100 parts by weight of MB20X-5 by Sekisui Plastics Co., Ltd. to prepare a coating solution. The coating solution was coated onto one surface of the oriented film obtained in Example 1 by a bar coating method to form a coated film. The coated film was then irradiated with ultraviolet rays to form a scattering layer. The thickness of the scattering layer was 4 μm.

The oriented film on which the scattering layer had been formed was attached to a glass panel in the same manner as Example 1 to fabricate a rear-projection screen. The picture brightness and visibility from the opposite side of the screen were both highly satisfactory.

Example 6

The oriented film fabricated in Example 1 was attached to a commercially available dichromatic polarizing plate with the transmitting axis of the oriented film and the absorption axis of the dichromatic polarizing plate aligned. The film was also attached to a glass panel as shown in FIG. 2, to fabricate a transmissive screen.

The transmissive screen was placed at a position as shown in FIG. 2, and the brightness, contrast and glare of a picture projected from a projector were evaluated visually from the other side of the transmissive screen. The picture had satisfactory brightness and contrast and no feeling of glare, and was therefore confirmed to be useful as a transmissive projector screen.

Example 7

PARALOID BTA712 core-shell fine particles by Kureha Corp. (mean refractive index: 1.54) were used as the macromolecular fine particles. The same procedure was carried out as in Example 1, except that the mixing proportion of the PET resin and macromolecular fine particles was 85:15 (weight ratio) and the heat fixing treatment was carried out at 120° C., to obtain a 100 μm-thick oriented film.

Next, a commercially available dichromatic polarizing plate was attached thereto with the transmitting axis of the oriented film and the absorption axis of the dichromatic polarizing plate aligned. The film was also attached to a glass panel as shown in FIG. 3, to fabricate a reflective screen.

The reflective screen was placed at a position as shown in FIG. 3, and the brightness, contrast and glare of a picture projected from a projector were evaluated visually from the projector side. The picture had satisfactory brightness and contrast and no feeling of glare, and was therefore confirmed to be useful as a reflective projector screen.

INDUSTRIAL APPLICABILITY

The transparent screen of the invention produces bright and high-quality projected images, with virtually no moire effect or glare. It is therefore very useful as a transmissive or reflective projector screen.

The invention claimed is:

1. A screen that comprises an oriented film having a direction of maximum scattering (scattering axis) and a direction of minimum scattering (transmitting axis) for linear polarized light, and containing macromolecular fine particles in a polymer matrix, wherein the refractive index n of the macromolecular fine particles satisfies the following inequality (1):

$$1.51 \leq n \leq 1.58 \tag{1},$$

and the matrix and macromolecular fine particles satisfy the relationship represented by the following inequalities (2) and (3):

$$0 \leq |N\text{trans} - n\text{trans}| \leq 0.03 \tag{2}$$

$$0.03 \leq |N\text{scat} - n\text{scat}| \leq 0.2 \tag{3}$$

(where Ntrans represents the refractive index of the matrix in the transmitting axis direction, Nscat represents the refractive index of the matrix in the scattering axis direction, ntrans represents the refractive index of the macromolecular fine particles in the transmitting axis direction and nscat represents their refractive index in the scattering axis direction), wherein the oriented film satisfies the following inequality (5):

$$1 \leq TT\text{trans}/TT\text{scat} \leq 2 \tag{5}$$

(where TTtrans represents the total light transmittance on the transmitting axis and TTscat represents the total light transmittance on the scattering axis), and wherein the oriented film satisfies the following inequality (6):

$$TT\text{scat} \geq 70\% \tag{6}$$

(where TT represents the total light transmittance).

2. A screen according to claim 1, wherein the oriented film satisfies the following inequality (4):

$$Hscat/Htrans \geq 2 \quad (4)$$

(where Hscat represents the haze value in the scattering axis direction and Htrans represents the haze value in the transmitting axis direction).

3. A screen according to claim 1, wherein the oriented film satisfies the following inequality (7):

$$PTtrans=TTtrans-DFtrans \geq 50\% \quad (7)$$

(where PTtrans represents the parallel light transmittance in the transmitting axis direction, TTtrans represents the total light transmittance in the transmitting axis direction, and DFtrans represents the diffused light transmittance in the transmitting axis direction).

4. A screen according to claim 1, wherein the oriented film satisfies the following inequality (8):

$$PTscat=TTscat-Dfscat- \leq 40\% \quad (8)$$

(where PTscat represents the parallel light transmittance in the scattering axis direction, TTscat represents the total light transmittance in the scattering axis direction, and DFscat represents the diffused light transmittance in the scattering axis direction).

5. A screen according to claim 1, which further comprises a transparent base, the oriented film and base being attached together.

6. A screen according to claim 1, wherein the content of the macromolecular fine particles in the oriented film is 0.01-40 parts by weight to 100 parts by weight of the polymer.

7. A screen according to claim 1, wherein the macromolecular fine particles are fine particles having a core-shell structure.

8. A screen according to claim 1, wherein the polymer is polyethylene terephthalate.

9. A screen according to claim 1, which further comprises a polarizing element.

10. A screen according to claim 1, which further comprises a metal layer.

11. A screen according to claim 1, which is a rear-projection screen.

12. A screen according to claim 1, which is a front-reflective screen.

13. A screen that comprises an oriented film having a direction of maximum scattering (scattering axis) and a direction of minimum scattering (transmitting axis) for linear polarized light, and containing macromolecular fine particles in a polymer matrix, wherein the refractive index n of the macromolecular fine particles satisfies the following inequality (1):

$$1.51 \leq n \leq 1.58 \quad (1),$$

and the matrix and macromolecular fine particles satisfy the relationship represented by the following inequalities (2) and (3):

$$0 \leq |Ntrans-ntrans| \leq 0.03 \quad (2)$$

$$0.03 \leq |Nscat-nscat| \leq 0.2 \quad (3)$$

(where Ntrans represents the refractive index of the matrix in the transmitting axis direction, Nscat represents the refractive index of the matrix in the scattering axis direction, ntrans represents the refractive index of the macromolecular fine particles in the transmitting, axis direction and nscat represents their refractive index in the scattering axis direction), and the oriented film simultaneously satisfies the following inequalities (4) to (6):

$$Hscat/Htrans \geq 2 \quad (4)$$

$$1 \leq TTtrans/TTscat \leq 2 \quad (5)$$

$$TT \geq 70\% \quad (6)$$

(where Hscat represents the haze value on the scattering axis, Htrans represents the haze value in the transmitting axis direction, TTtrans represents the total light transmittance on the transmitting axis, TTscat represents the total light transmittance on the scattering axis, and TT represents the total light transmittance).

14. A method of using an oriented film, comprising forming a screen from an oriented film having a direction of maximum scattering (scattering axis) and a direction of minimum scattering (transmitting axis) for linear polarized light, and containing macromolecular fine particles in a polymer matrix, wherein the refractive index n of the macromolecular fine particles satisfies the following inequality (1):

$$1.51 \leq n \leq 1.58 \quad (1),$$

the matrix and macromolecular fine particles satisfy the relationship represented by the following inequalities (2) and (3):

$$0 \leq |Ntrans-ntrans| \leq 0.03 \quad (2)$$

$$0.03 \leq |Nscat-nscat| \leq 0.2 \quad (3)$$

(where Ntrans represents the refractive index of the matrix in the transmitting axis direction, Nscat represents the refractive index of the matrix in the scattering axis direction, ntrans represents the refractive index of the macromolecular fine particles in the transmitting axis direction and nscat represents their refractive index in the scattering axis direction), wherein the oriented film satisfies the following inequality (5):

$$1 \leq TTtrans/TTscat \leq 2 \quad (5)$$

(where TTtrans represents the total light transmittance on the transmitting axis and TTscat represents the total light transmittance on the scattering axis), and wherein the oriented film satisfies the following inequality (6):

$$TTscat \geq 70\% \quad (6)$$

(where TT represents the total light transmittance).

* * * * *